US009813154B2

(12) United States Patent
Parekh et al.

(10) Patent No.: US 9,813,154 B2
(45) Date of Patent: *Nov. 7, 2017

(54) BIDIRECTIONAL DATA COMMUNICATIONS CABLE

(71) Applicant: Cosemi Technologies, Inc., Irvine, CA (US)

(72) Inventors: Devang Parekh, Sunnyvale, CA (US); Nguyen X. Nguyen, Irvine, CA (US)

(73) Assignee: Cosemi Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/186,375

(22) Filed: Jun. 17, 2016

(65) Prior Publication Data

US 2016/0301473 A1    Oct. 13, 2016

Related U.S. Application Data

(63) Continuation of application No. 14/685,951, filed on Apr. 14, 2015, now Pat. No. 9,397,751.

(Continued)

(51) Int. Cl.
*H04B 10/00* (2013.01)
*H04B 10/25* (2013.01)

(Continued)

(52) U.S. Cl.
CPC ....... *H04B 10/2503* (2013.01); *G02B 6/3546* (2013.01); *G02B 6/3588* (2013.01);

(Continued)

(58) Field of Classification Search
CPC H04B 10/2503; H04B 10/2504; H04B 10/40; H04Q 11/0005; H04Q 2011/0035;

(Continued)

(56) References Cited

U.S. PATENT DOCUMENTS 5,966,387 A    10/1999   Cloutier
7,551,852 B2 *  6/2009   Reintjes ............. H04B 10/2503
                                                        398/107

(Continued)

FOREIGN PATENT DOCUMENTS

EP          1978656        10/2008
WO     WO2008119669        10/2008
WO     WO2012059071         5/2012

OTHER PUBLICATIONS

PCT/US112/57520. Int'l Search Report & Written Opinion dated Feb. 1, 2013.

(Continued)

*Primary Examiner* — M. R. Sedighian
(74) *Attorney, Agent, or Firm* — Loza & Loza, LLP; George Fountain

(57) ABSTRACT

A bidirectional data communications cable is disclosed. The cable includes first connector, second connector, and cable housing coupled to the first and second connectors. The first connector includes a controller configured to determine whether the first connector is connected to a data source or data sink. If connected to a data source, the controller configures a switch circuit to route a data signal from the data source to an optical modulator for modulating an optical signal for transmission from the first to the second connector via an optical fiber. If connected to a data sink, the controller configures the switch circuit to route a data signal from an optical demodulator to the data sink, the optical demodulator receiving an optical signal modulated with the data signal from the second connector via an optical fiber. The second connector is configured similar to the first connector. The cable housing encloses the optical fibers.

22 Claims, 4 Drawing Sheets

Related U.S. Application Data

(60) Provisional application No. 61/979,239, filed on Apr. 14, 2014.

(51) Int. Cl.
*H04B 10/40* (2013.01)
*G02B 6/35* (2006.01)
*G02B 6/42* (2006.01)
*G02B 6/43* (2006.01)
*H04Q 11/00* (2006.01)

(52) U.S. Cl.
CPC ......... *G02B 6/4246* (2013.01); *G02B 6/4292* (2013.01); *G02B 6/43* (2013.01); *H04B 10/2504* (2013.01); *H04B 10/40* (2013.01); *H04Q 11/0005* (2013.01); *H04Q 2011/0035* (2013.01)

(58) Field of Classification Search
CPC .. G02B 6/3546; G02B 6/3588; G02B 6/4246; G02B 6/4292; G02B 6/43
USPC .............................. 398/17, 135, 139; 385/17
See application file for complete search history.

(56) References Cited

U.S. PATENT DOCUMENTS

| | | | |
|---|---|---|---|
| 7,602,739 B2 | 10/2009 | Weigert | |
| 7,941,052 B2* | 5/2011 | Epitaux | H04J 14/02 398/128 |
| 8,068,742 B2 | 11/2011 | Cole et al. | |
| 8,805,195 B2* | 8/2014 | Mateosky | H04L 27/2096 398/135 |
| 8,824,898 B2 | 9/2014 | Groepl et al. | |
| 8,831,436 B2* | 9/2014 | Evans | H04B 10/073 398/162 |
| 8,935,740 B2 | 1/2015 | Suzuki et al. | |
| 8,948,197 B2 | 2/2015 | Jiang et al. | |
| 9,397,751 B2* | 7/2016 | Parekh | H04B 10/2503 |
| 2002/0126967 A1 | 9/2002 | Panak et al. | |
| 2003/0132941 A1 | 7/2003 | Echizenya | |
| 2004/0056732 A1 | 3/2004 | Errington | |
| 2004/0184746 A1 | 9/2004 | Chang et al. | |
| 2006/0024067 A1 | 2/2006 | Koontz | |
| 2006/0221948 A1 | 10/2006 | Benner et al. | |
| 2007/0014522 A1 | 1/2007 | Yamaguchi et al. | |
| 2007/0237463 A1 | 10/2007 | Aronson | |
| 2007/0237470 A1 | 10/2007 | Aronson et al. | |
| 2007/0286600 A1 | 12/2007 | Guo et al. | |
| 2008/0031629 A1 | 2/2008 | Nguyen et al. | |
| 2009/0260043 A1 | 10/2009 | Tatsuta et al. | |
| 2010/0284323 A1 | 11/2010 | Tang et al. | |
| 2011/0091219 A1* | 4/2011 | Tatum | G02B 6/4201 398/142 |
| 2011/0111642 A1 | 5/2011 | Sloey et al. | |
| 2012/0249871 A1 | 10/2012 | Nguyen et al. | |
| 2013/0147520 A1 | 6/2013 | Payne | |
| 2014/0346325 A1 | 11/2014 | Frank | |
| 2015/0110499 A1 | 4/2015 | Jiang et al. | |
| 2015/0295647 A1 | 10/2015 | Parekh et al. | |

OTHER PUBLICATIONS

PCT/US12/57520. Int'l Prelim. Report of Patentability dated Apr. 1, 2014.

PCT/US14/045310. Int'l Search Report & Written Opinion dated Nov. 5, 2014.

\* cited by examiner

BIDIRECTIONAL DATA COMMUNICATIONS CABLE

CROSS-REFERENCE TO RELATED APPLICATIONS

This application is a continuation of U.S. patent application Ser. No. 14/685,951, filed on Apr. 14, 2015, entitled "Bidirectional Data Communications Cable," which, in turn, claims the benefit of the filing date of Provisional Application Ser. No. 61/979,239, filed on Apr. 14, 2014, and entitled "Bidirectional Consumer Active Optical Cable IC," both of which are incorporated herein by reference.

FIELD

This disclosure relates generally to data communications cables, and in particular, to a bidirectional data communications cable.

BACKGROUND

Next-generation consumer audio-visual cables, e.g., High Definition Multimedia Interface (HDMI), Digital Visual Interface (DVI), and DisplayPort will operate at data rates greater than 10 Gigabytes per seconds (Gb/s). This presents an ideal transition point for using optical fiber for the data channels. Optical fiber is a low-loss medium capable of high data rates, longer transmission distances, and lower power consumption (for extremely high speeds) in contrast with copper wire solutions. However, consumer active optical HDMI cables have been unidirectional source to sink/display. As such, the ends of the cables are not interchangeable.

Thus, a bidirectional data communications cable capable of transmitting high speed data, such as HDMI, DVI, and DisplayPort multimedia data and control signaling, is disclosed herein.

SUMMARY

An aspect of the disclosure relates to a bidirectional data communications cable. The bidirectional data communications cable comprises a first connector configured to mate with a corresponding connector of a data source or a data sink. The first connector comprises: (1) a first controller configured to generate a first mode signal based on whether the first connector is connected to the data source or the data sink; (2) a first modulator configured to modulate a first optical signal with a first data signal from the data source based on the first mode signal; (3) a first demodulator configured to demodulate a second optical signal to produce a second data signal based on the first mode signal; and (4) a first switch circuit configured to: (a) route the first data signal from the data source to the first modulator based on the first mode signal indicating that the first connector is connected to the data source; and (b) route the second data signal from the first demodulator to the data sink based on the first mode signal indicating that the first connector is connected to the data sink.

The bidirectional data communications cable further comprises a second connector configured to mate with a corresponding connector of the data source or the data sink. The second connector comprises: (1) a second controller configured to generate a second mode signal based on whether the second connector is connected to the data source or the data sink; (2) a second modulator configured to modulate the second optical signal with the second data signal from the data source based on the second mode signal; (3) a second demodulator configured to demodulate the first optical signal to produce the first data signal based on the second mode signal; and (4) a second switch circuit configured to: (a) route the second data signal from the data source to the second modulator based on the second mode signal indicating that the second connector is connected to the data source; and (b) route the first data signal from the second demodulator to the data sink based on the second mode signal indicating that the second connector is connected to the data sink.

The bidirectional data communications cable further comprises a cable housing at least partially enclosing: (1) a first set of one or more optical fibers for transmitting the first modulated optical signal from the first connector to the second connector; and (2) a second set of one or more optical fibers for transmitting the second modulated optical signal from the second connector to the first connector.

Other embodiments or variants of the aforementioned communications cable are disclosed. Further, other aspects, advantages and novel features of the disclosure will become apparent from the following detailed description of the invention when considered in conjunction with the accompanying drawings.

DETAILED DESCRIPTION OF THE EXEMPLARY EMBODIMENTS

Figure 1:
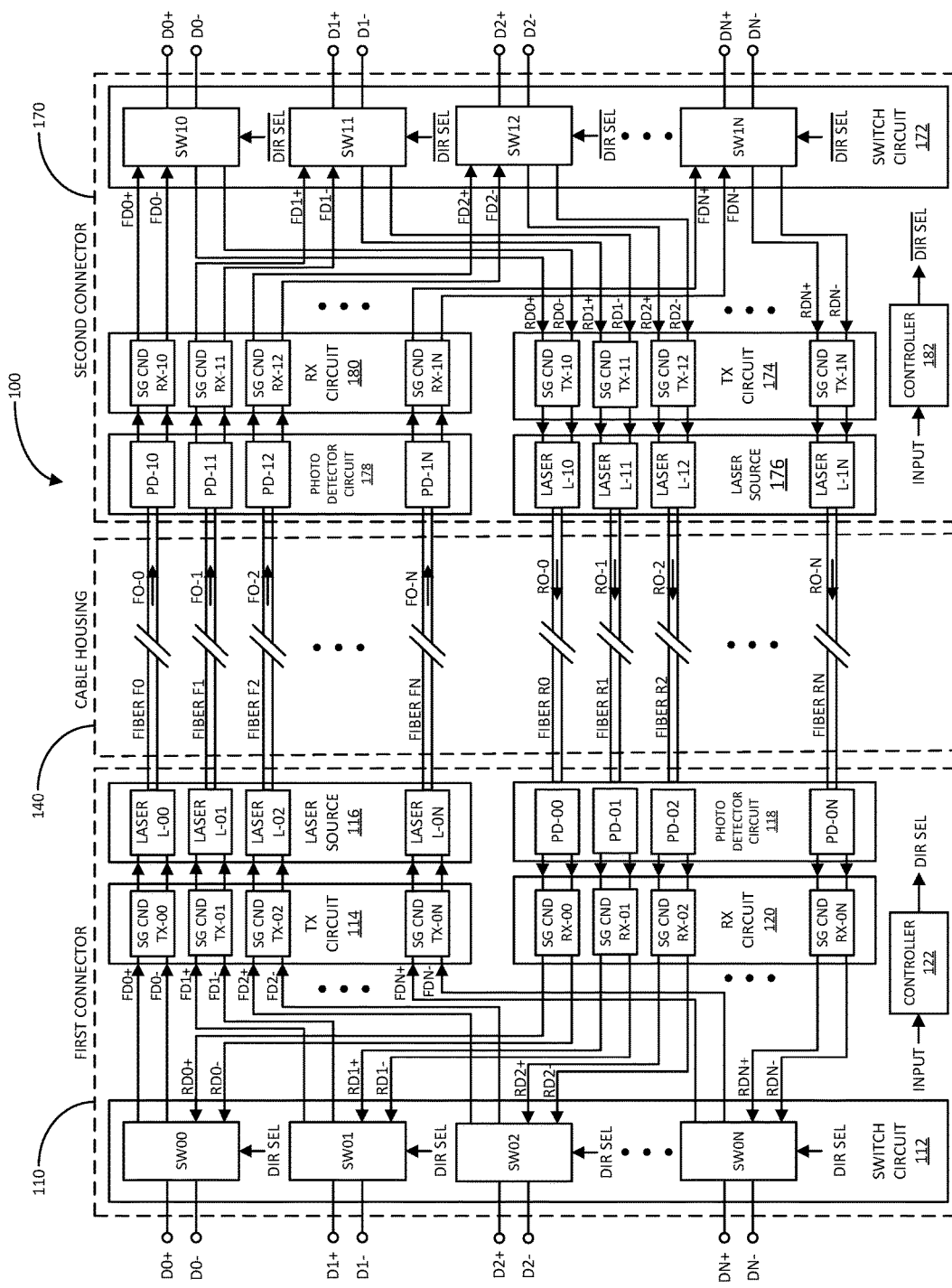
FIG. 1 illustrates a diagram of an exemplary bidirectional data communications cable in accordance with an aspect of the disclosure.

FIG. 1 illustrates a diagram of an exemplary bidirectional data communications cable 100 in accordance with an aspect of the disclosure. The communications cable 100 comprises a first connector 110, a second connector 170, and a cable housing 140 having opposite ends mechanically coupled or attached to the first and second connectors 110 and 170, respectively.

Since the data communications cable 100 is bidirectional, both the first and second connectors 110 and 170 are each configured to connect to either a corresponding connector of a source of high speed data or a corresponding connector of a sink of high speed data. For instance, if the first connector 110 is connected to a high speed data source, the second connector 170 is connected to a high speed data sink. Conversely, if the second connector 170 is connected to a high speed data source, the first connector 110 is connected to a high speed data sink.

The high speed data may be multimedia data (e.g., audio/video data), such as those specified in the HDMI, DVI, DisplayPort, and other standards, as well as future standards. Examples of high speed data sources include digital video recorders (DVRs), optical disc players, multimedia distribution facilities, and others. Examples of high speed data sinks include display monitors, television sets, projectors, DVRs, and others.

The high speed data are in the form of electrical digital signals. As an example, the high speed data may be configured as transition-minimized differential signaling (TMDS). For instance, the first and second connectors 110 and 170 may each be configured to receive or produce N+1 number of parallel high speed differential signals D0+/D0−, D1+/D1−, D2+/D2− to DN+/DN− associated with the high speed data.

For clarity purposes, the differential signals D0+/D0− to DN+/DN− are referred to as FDO+/FDO− to FDN+/FDN−, if they are sent from the first connector 110 to the second connector 170. The differential signals D0+/D0 to DN+/DN are referred to as RDO+/RDO− to RDN+/RDN−, if they are sent from the second connector 170 to the first connector 110. As the data communications cable 100 is bidirectional, the designations "F" and "R" are arbitrary, and do not imply a directional-dependent implementation for the physical cable.

In the case where the first connector 110 is connected to a high speed data source, the first connector 110 includes circuitry configured to convert the high speed data electrical signals FD0+/FD0− to FDN+/FDN− into corresponding modulated optical signals for transmission to the second connector 170 by way of optical fibers F0 to FN situated within the cable housing 140, respectively. In the case where the first connector 110 is connected to a high speed data sink, the first connector 110 includes circuitry configured to convert modulated optical signals received from the second connector 170 by way of optical fibers R0 to RN situated within the cable housing 140 into high speed data electrical signals RD0+/RD0− to RDN+/RDN−, respectively.

Conversely, in the case where the second connector 170 is connected to a high speed data source, the second connector 170 includes circuitry configured to convert the high speed electrical signals RD0+/RD0− to RDN+/RDN− into optical signals for transmission to the first connector 110 by way of optical fibers R0 to RN, respectively. In the case that the second connector 170 is connected to a high speed data sink, the second connector 170 includes circuitry configured to convert optical signals received from the first connector 110 by way of optical fibers F0 to FN to the high speed electrical signals FD0+/FD0− to FDN+/FDN−, respectively.

With reference to FIG. 1, the first connector 110 comprises a switch circuit 112, a transmitter circuit 114, a laser source 116, a photo detector circuit 118, a receiver circuit 120, and a controller 122. The switch circuit 112 is configured to either receive or produce the high speed electrical signals D0+/D0− to DN+/DN−, depending on whether it is connected to a high speed data source or a high speed data sink.

The controller 122 determines whether the first connector 110 is connected to the signal source or the signal sink based on an input. For instance, the input may be from a user interface, which allows a user to select whether the first connector 110 is connected to a high speed data source or sink. The input may also be detected signal activity at contacts of the first connector 110, such as the contacts associated with signals D0+/D0− to DN+/DN− and/or with control signals discussed further herein with respect to another embodiment. The input may be detected signal activity at the output of the receiver circuit 120 and/or the photo detector circuit 118. The input may be a control signal received by way of the first and/or second connectors 110 and 170. Based on the input, the controller 122 generates a mode signal DIR SEL for configuring the switch circuit 112 for receiving or producing high speed electrical signals D0+/D0− to DN+/DN−.

More specifically, the switch circuit 112 comprises individual switching components SW00, SW01, SW02 to SW0N. Each of the switching components is configured as a differential pair of single-pole-double-throw switching elements. The switching components SW00, SW01, SW02 to SW0N also include ports (e.g., the switch pole) coupled to contacts of the first connector 110 associated with the high speed electrical signals D0+/D0−, D1+/D1−, D2+/D2− to DN+/DN−, respectively. The switching components SW00, SW01, SW02 to SW0N include outputs ports (e.g., the first switch throw) coupled to inputs of signal conditioning components TX-00, TX-01, TX-02 to TX-0N of the transmitter circuit 114, respectively. Further, the switching components SW00, SW01, SW02 to SW0N further include input ports (e.g., the second switch throw) coupled to outputs of signal conditioning components RX-00, RX-01, RX-02 to RX-0N of the receiver circuit 120, respectively.

If the controller 122 determines that the first connector 110 is connected to a high speed data source, the controller 122 generates the mode signal DIR SEL to configure switching components SW00, SW01, SW02 to SW0N to couple the first connector contacts associated with signals D0+/D0−, D1+/D1−, D2+/D2− to DN+/DN− with inputs of the signal conditioning components TX-00, TX-01, TX-02 to TX-0N of the transmitter circuit 114, respectively.

In such configuration, the signal conditioning components TX-00, TX-01, TX-02 to TX-0N of the transmitter circuit 114 receive the high speed data differential electrical signals FD0+/FD0−, FD1+/FD1−, FD2+/FD2− to FDN+/FDN, respectively. The signal conditioning components TX-00, TX-01, TX-02 to TX-0N condition the signals FD0+/FD0−, FD1+/FD1−, FD2+/FD2− to FDN+/FDN− suitable for driving (modulating) individual lasers L-00, L-01, L-02 to L-0N of the laser source 116, respectively. In response to the drive signals, the lasers L-00, L-01, L-02 to L-0N generate modulated optical signals FO-0, FO-1, FO-2 to FO-N for transmission to the second connector 170 by way of optical fibers F0, F1, F2 to FN, respectively.

If, on the other hand, the controller 122 determines that the first connector 110 is connected to a high speed data sink, the controller 122 generates the mode signal DIR SEL to configure the switching components SW00, SW01, SW02 to SW0N to couple the first connector contacts associated with differential signals D0+/D0−, D1+/D1−, D2+/D2− to DN+/DN− with the outputs of the signal conditioning components RX-00, RX-01, RX-02 to RX-0N of the receiver circuit 120, respectively.

In such case, individual photo detectors PD-00, PD-01, PD-02 to PD-0N of the photo detector circuit 118 receive modulated optical signals RO-0, RO-1, RO-2 to RO-N from the second connector 170 by way of optical fibers R0, R1, R2 to RN situated within the cable housing 140, respectively. In response to the modulated optical signals RO-0, RO-1, RO-2 to RO-N, the photo detectors PD-00, PD-01, PD-02 to PD-0N generate corresponding electrical signals, which are provided to the signal conditioning components RX-00, RX-01, RX-02 to RX-0N of the receiver circuit 120, respectively.

The signal conditioning components RX-00, RX-01, RX-02 to RX-0N condition the corresponding electrical signals into differential signals RD0+/RD0, RD1+/RD1−, RD2+/RD2− to RDN+/RDN− in a format suitable for the high speed data sink, such as into TMDS signals required by many of the protocols, such as HDMI, DVI, and DisplayPort.

As previously discussed, since the controller 122 has configured the switch circuit 112 such that the switching components SW00, SW01, SW02 to SW0N couple the first connector contacts to the respective outputs of the signal conditioning components RX-00, RX-01, RX-02 to RX-0N, the differential signals RD0+/RD0−, RD1+/RD1−, RD2+/RD2− to RDN+/RDN− are routed to the contacts for providing them to the high speed data sink.

Again, since the high speed data communications cable 100 is bidirectional, the operations of the components of the second connector 170 is effectively the same as the components of the first connector 110. For the sake of completeness, the description of the components and operations of the second connector 170 follows:

The second connector 170 comprises a switch circuit 172, a transmitter circuit 174, a laser source 176, a photo detector circuit 178, a receiver circuit 180, and a controller 182. The switch circuit 172 is configured to either receive or produce high speed electrical signals D0+/D0− to DN+/DN−, depending on whether it is connected to a high speed data source or sink.

The controller 182 determines whether the second connector 170 is connected to the data source or the data sink based on an input. For instance, the input may be from a user interface, which allows a user to select whether the second connector 170 is connected to a high speed data source or sink. The input may also be detected signal activity at contacts of the first connector 170, such as the contacts associated with signals D0+/D0− to DN+/DN− and/or with control signals discussed further herein with respect to another embodiment. The input may be detected signal activity at the output of the receiver circuit 180 and/or the photo detector circuit 178. The input may be a control signal received by way of the second and/or first connectors 170 and 110. Based on the input, the controller 182 generates a mode signal $\overline{\text{DIRSEL}}$ (complementary of mode signal DIRSEL generated by controller 122 of the first connector 110) for configuring the switch circuit 172 for receiving or producing the high speed data electrical signals D0+/D0− to DN+/DN−.

More specifically, the switch circuit 172 comprises individual switching components SW10, SW11, SW12 to SW1N. Each of the switching components is configured as a differential pair of single-pole-double-throw switching elements. The switching components SW10, SW11, SW12 to SW1N include ports (e.g., the switch pole) coupled to contacts of the second connector 170 associated with high speed electrical signals D0+/D0−, D1+/D1−, D2+/D2− to DN+/DN−, respectively. The switching components SW10, SW11, SW12 to SW1N also include outputs ports (e.g., the first switch throw) coupled to inputs of signal conditioning components TX-10, TX-11, TX-12 to TX-1N of the transmitter circuit 174, respectively. Further, the switching components SW10, SW11, SW12 to SW1N also include input ports (e.g., the second switch throw) coupled to outputs of signal conditioning components RX-10, RX-11, RX-12 to RX-1N of the receiver circuit 180, respectively.

If the controller 182 determines that the second connector 170 is connected to a high speed data source, the controller 182 generates the mode signal $\overline{\text{DIRSEL}}$ to configure the switching components SW10, SW11, SW12 to SW1N to couple the second connector contacts associated with signals D0+/D0−, D1+/D1−, D2+/D2− to DN+/DN− to inputs of the signal conditioning components TX-10, TX-11, TX-12 to TX-1N of the transmitter circuit 174, respectively.

In such configuration, the signal conditioning components TX-10, TX-11, TX-12 to TX-1N receive the high speed differential signals RD0+/RD0−, RD1+/RD1−, RD2+/RD2− to RDN+/RDN−, respectively. The signal conditioning components TX-10, TX-11, TX-12 to TX-1N condition the signals RD0+/RD0−, RD1+/RD1−, RD2+/RD2− to RDN+/RDN− suitable for driving (modulating) individual lasers L-10, L-11, L-12 to L-1N of the laser source 176, respectively. In response to the respective drive signals, the lasers L-10, L-11, L-12 to L-1N generate modulated optical signals RO-0, RO-1, RO-2 to RO-N for transmission to the first connector 110 by way of optical fibers R0, R1, R2 to RN, respectively.

If, on the other hand, the controller 182 determines that the second connector 170 is connected to a high speed data sink, the controller 182 generates the mode signal $\overline{\text{DIRSEL}}$ to configure the switching components SW10, SW11, SW12 to SW1N to couple the second connector contacts associated with signals D0+/D0−, D1+/D1−, D2+/D2− to DN+/DN− with the outputs of the signal conditioning components RX-10, RX-11, RX-12 to RX-1N of the receiver circuit 180, respectively.

In such case, individual photo detectors PD-10, PD-11, PD-12 to PD-1N of the photo detector circuit 178 receive modulated optical signals FO-0, FO-1, FO-2 to FO-N from the first connector 110 by way of optical fibers F0, F1, F2 to FN, respectively. In response to the modulated optical signals FO-0, FO-1, FO-2 to FO-N, the photo detectors PD-10, PD-11, PD-12 to PD-1N generate corresponding electrical signals, which are provided to the signal conditioning components RX-10, RX-11, RX-12 to RX-1N of the receiver circuit 180, respectively. The signal conditioning components RX-10, RX-11, RX-12 to RX-1N condition the corresponding electrical signals to generate differential signals FD0+/FD0−, FD1+/FD1−, FD2+/FD2− to FDN+/FDN− in a format suitable for the high speed data sink, such as into TMDS signals required by many of the protocols, such as HDMI, DVI, and DisplayPort.

As previously discussed, since the controller 182 has configured the switch circuit 172 such that the switching components SW10, SW11, SW12 to SW1N couple the second connector contacts to the respective outputs of the signal conditioning components RX-10, RX-11, RX-12 to RX-1N, the signals FD0+/FD0−, FD1+/FD1−, FD2+/FD2− to FDN+/FDN− are routed to the contacts for providing them to the high speed data sink.

Figure 2:
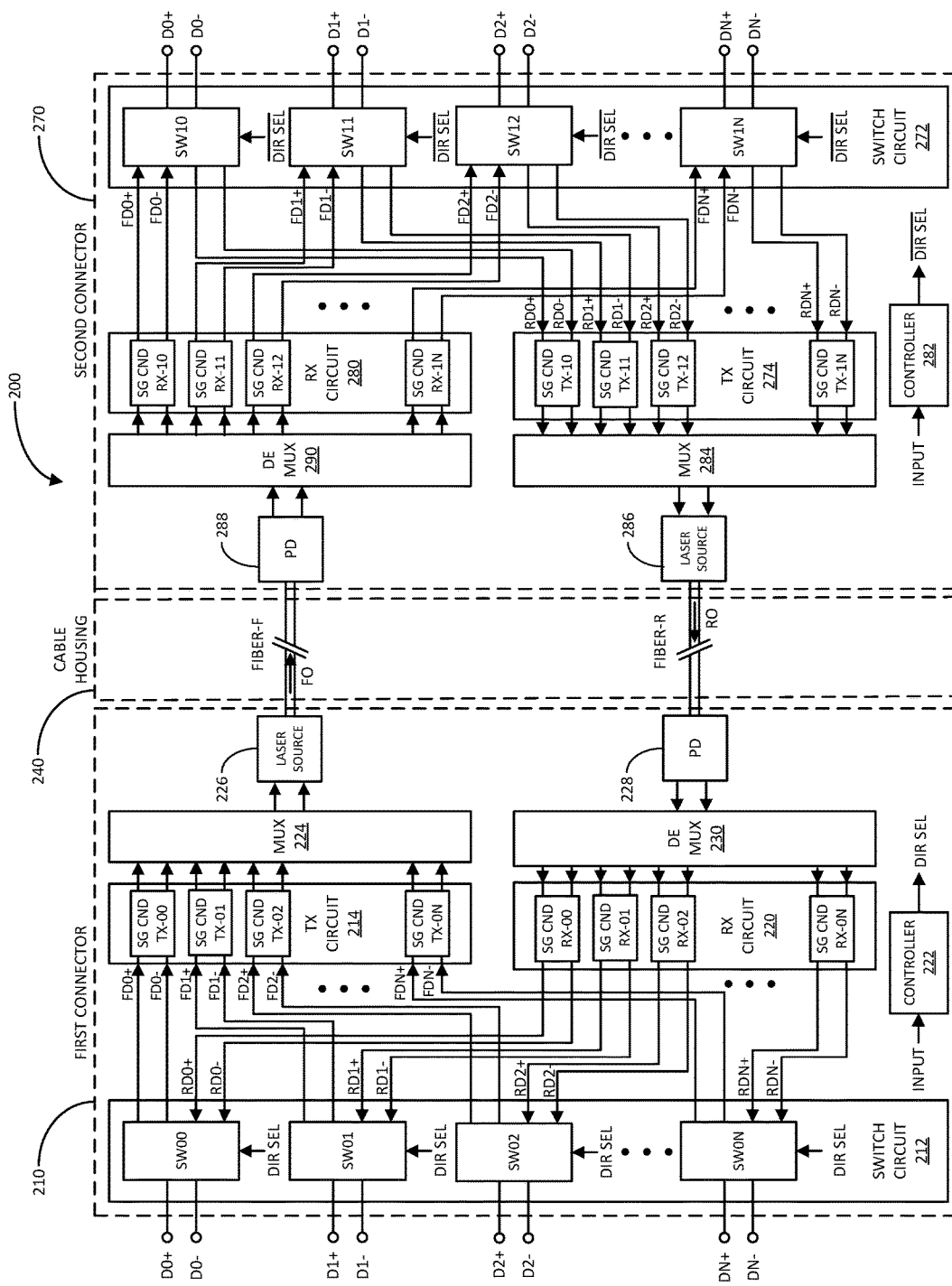
FIG. 2 illustrates a diagram of another exemplary bidirectional data communications cable in accordance with another aspect of the disclosure.

FIG. 2 illustrates a diagram of another exemplary bidirectional data communications cable 200 in accordance with another aspect of the disclosure. The data communications cable 200 is similar to that of cable 100 previously discussed, and includes many of the same or similar elements as indicated by the same reference numbers, with the exception that the most significant digit is a "2" rather than a "1". The data communications cable 200 differs from cable 100 in that cable 200 comprises multiplexers (MUX) and de-multiplexers (DEMUX) for multiplexing and de-multiplexing data signals. The multiplexed data signals are used for modulating one or more optical signals for transmission from the first connector to the second connector or vice-versa, and the de-multiplexed data signals are generated at the receiving connector from the one or more modulated optical signals. Such configuration allows for a reduction in the number of optical fibers required for the data communications cable 200.

In particular, the data communications cable 200 comprises an input connector 210, a cable housing 240, and a second connector 270. The cable housing 240 includes opposite ends mechanically coupled or attached to the first and second connectors 210 and 270, respectively. The cable housing 240 protectively encloses an optical fiber F for transmitting an optical signal FO from the first connector 210 to the second connector 270. Additionally, the cable housing 240 protectively encloses another optical fiber R for transmitting an optical signal RO from the second connector 270 to the first connector 110.

The first connector 210 comprises a switch circuit 212, a transmitter circuit 214, a multiplexer (MUX) 224, and a laser source 226. The first connector 210 further comprises a photo detector (PD) 228, a de-multiplexer (DEMUX) 230, a receiver circuit 220, and a controller 222.

As in the previous embodiment, the controller 222 detects whether the first connector 210 is connected to a high speed data source or a high speed data sink based on an input. In response to such detection, the controller 222 generates a mode signal DIR SEL for configuring the switch circuit 212.

If the controller 222 detects that the first connector 210 is connected to a high speed data source, the controller 222 generates the DIR SEL mode signal to configure switching components SW00, SW01, SW02 to SW0N to couple the first connector contacts associated with differential signals D0+/D0−, D1+/D1, D2+/D2− to DN+/DN− to inputs of signal conditioning components TX-00, TX-01, TX-02 to TX-0N of the transmitter circuit 214, respectively. As in the previous embodiment, the signal conditioning components TX-00, TX-01, TX-02 to TX-0N generate appropriate drive signals for driving (modulating) the laser source 226 based on the differential signals FD0+/FD0−, FD1+/FD1−, FD2+/FD2− to FDN+/FDN−, respectively.

The drive signals generated by the signal conditioning components TX-00, TX-01, TX-02 to TX-0N of the transmitter circuit 214 are sent to the MUX 224. The MUX 224 multiplexes the drive signals onto a pair of differential lines coupled to the laser source 226. The laser source 226 modulates the multiplexed differential signals FD0+/FD0−, FD1+/FD1−, FD2+/FD2− to FDN+/FDN− onto an optical signal FO for transmission to the second connector 270 by way of the optical fiber F.

If the controller 222 detects that the first connector 210 is connected to a high speed data sink, the controller 222 generates the DIR SEL mode signal to configure the switching components SW00, SW01, SW02 to SW0N of the switch circuit 212 to couple the first connector contacts associated with differential signals D0+/D0−, D1+/D1−, D2+/D2− to DN+/DN− to outputs of signal conditioning components RX-00, RX-01, RX-02 to RX-0N of the receiver circuit 220, respectively.

In this case, the photo detector (PD) 228 receives a modulated optical signal RO from the second connector 270 by way of optical fiber R. The optical signal RO is modulated with a multiplexed differential signal RD0+/RD0−, RD1+/RD1−, RD2+/RD2− to RDN+/RDN−. In response to the optical signal RO, the photo detector 228 generates the corresponding multiplexed differential electrical signal. The DEMUX 230 de-multiplexes the multiplexed differential electrical signal, and provides the demultiplexed signals to the receiver circuit 220.

The signal conditioning components RX-00, RX-01, RX-02 to RX-0N of the receiver circuit 220 condition the corresponding demultiplexed differential signals to generate the differential signal RD0+/RD0−, RD1+/RD1−, RD2+/RD2− to RDN+/RDN− in a format suitable for the high speed data sink, such as into TMDS signals required by many of the protocols, such as HDMI, DVI, and DisplayPort.

As previously discussed, since the controller 222 has configured the switch circuit 212 such that the switching components SW00, SW01, SW02 to SW0N couple the first connector contacts to the respective outputs of the signal conditioning components RX-00, RX-01, RX-02 to RX-0N of the receiver circuit 220, the signals RD0+/RD0−, RD1+/RD1−, RD2+/RD2− to RDN+/RDN− are routed to the contacts for providing them to the high speed data sink.

Again, since the high speed data communications cable 200 is bidirectional, the operations of the components of the second connector 270 is effectively the same as the components of the first connector 210. For the sake of completeness, the description of the components and operations of the second connector 270 follows:

The second connector 270 comprises a switch circuit 272, a transmitter circuit 274, a multiplexer (MUX) 284, and a laser source 286. The second connector 270 further comprises a photo detector (PD) 288, a de-multiplexer (DEMUX) 290, a receiver circuit 280, and a controller 282.

As in the previous embodiment, the controller 282 detects whether the second connector 270 is connected to a high speed data source or a high speed data sink based on an input. In response to such detection, the controller 282 generates a mode signal $\overline{\text{DIRSEL}}$ for configuring the switch circuit 272.

If the controller 282 detects that the second connector 270 is connected to a high speed data source, the controller 282 generates the $\overline{\text{DIRSEL}}$ mode signal to configure switching components SW10, SW11, SW12 to SW1N to couple the second connector contacts associated with differential signals D0+/D0, D1+/D1−, D2+/D2− to DN+/DN− to inputs of signal conditioning components TX-10, TX-11, TX-12 to TX-1N of the transmitter circuit 274, respectively. As in the previous embodiment, the signal conditioning components TX-10, TX-11, TX-12 to TX-1N generate appropriate drive signals for driving (modulating) the laser source 286 based on the differential signals RD0+/RD0−, RD1+/RD1−, RD2+/RD2− to RDN+/RDN−, respectively.

The drive signals generated by the signal conditioning components TX-10, TX-11, TX-12 to TX-1N of the transmitter circuit 274 are sent to the MUX 284. The MUX 284 multiplexes the drive signals onto a pair of differential lines coupled to the laser source 286. The laser source 286 modulates the multiplexed differential signals RD0+/RD0−, RD1+/RD1−, RD2+/RD2− to RDN+/RDN− onto an optical signal RO for transmission to the first connector 210 by way of the optical fiber R.

If the controller 282 detects that the second connector 270 is connected to a high speed data sink, the controller 282 generates the $\overline{\text{DIRSEL}}$ mode signal to configure the switching components SW10, SW11, SW12 to SW1N of the switch circuit 272 to couple the second connector contacts associated with differential signals D0+/D0−, D1+/D1−, D2+/D2− to DN+/DN− to outputs of signal conditioning components RX-10, RX-11, RX-12 to RX-1N of the receiver circuit 280, respectively.

In this case, the photo detector 288 receives a modulated optical signal FO from the first connector 210 by way of optical fiber F. The optical signal FO is modulated with multiplexed differentials signals FD0+/FD0−, FD1+/FD1−, FD2+/FD2− to FDN+/FDN−. In response to the optical signal FO, the photo detector 288 generates the multiplexed differential electrical signals. The DEMUX 290 de-multiplexes the multiplexed differential signals, and provides the demultiplexed signals to the receiver circuit 280.

The signal conditioning components RX-10, RX-11, RX-12 to RX-1N condition the corresponding demultiplexed electrical signals into differential signals FD0+/FD0−, FD1+/FD1−, FD2+/FD2− to FDN+/FDN− in a format suitable for a high speed data sink, such as into TMDS signals required by many of the protocols, such as HDMI, DVI, and DisplayPort.

As previously discussed, since the controller 282 has configured the switch circuit 272 such that the switching components SW10, SW11, SW12 to SW1N couple the second connector contacts to the respective outputs of the signal conditioning components RX-10, RX-11, RX-12 to RX-1N, the signals FD0+/FD0−, FD1+FD1−, FD2+/FD2− to FDN+/FDN− are routed to the contacts for providing them to the high speed data sink.

Although in exemplary data communications cable 200, the corresponding MUX multiplexed the differential signals for transmission via a single optical fiber, it shall be understood that the cable 200 may comprise a plurality of MUXs to multiplex respective subsets of the differential signals for transmission by way of corresponding optical fibers. In such case, the data communications cable 200 may comprise a plurality of DEMUX to demultiplex respective subsets of the differential signals received by way of corresponding optical fibers.

Figure 3:
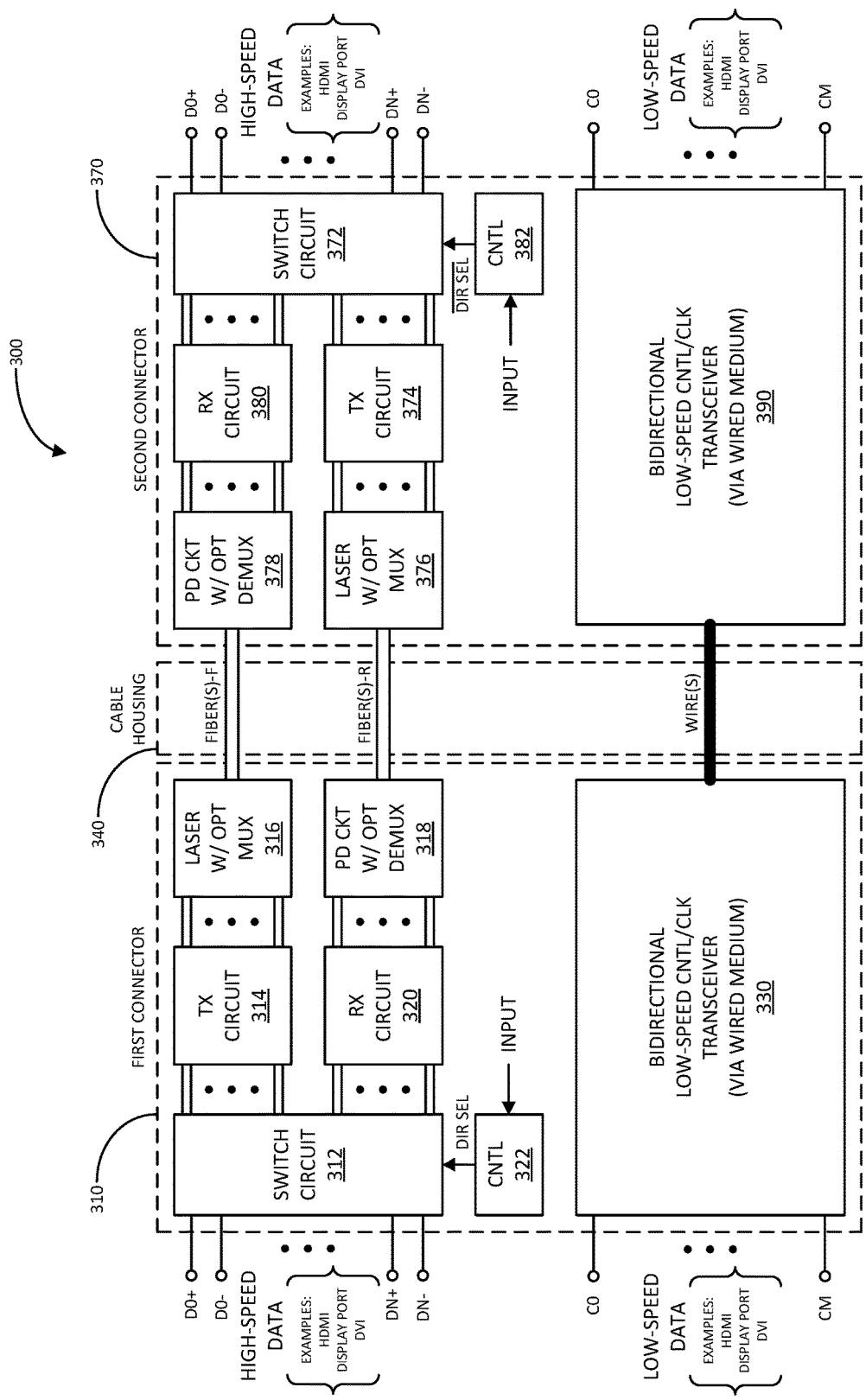
FIG. 3 illustrates a diagram of yet another exemplary bidirectional data communications cable in accordance with another aspect of the disclosure.

FIG. 3 illustrates an exemplary bidirectional data communications cable 300 in accordance with another aspect of the disclosure. As previously discussed, the data communications cables described herein may be configured for HDMI, DVI, and Display Port applications. In such applications, the data communications cables facilitate the transmission of not only the high speed multimedia (e.g., audio/video) data, but also associated control signaling (e.g., control data and/or clock).

For example, HDMI has the SDA, SCL, and CEC controls signals that are typically transmitted with the high speed multimedia data. DisplayPort has the auxiliary positive and negative signals AUX+ and AUX− that are typically transmitted with the high speed multimedia data. And, DVI has control signal and clock DDC Data and DDC CLK that are typically transmitted with the high speed multimedia data.

With reference to FIG. 3, the data communications cable 300 comprises a first connector 310, a cable housing 340, and a second connector 370. The cable housing 340 includes opposite ends mechanically coupled or attached to the first and second connectors 310, and 370, respectively.

The cable housing 340 protectively encloses one or more optical fibers F for transmission of modulated optical signals from the first connector 310 to the second connector 370, encloses one or more other optical fibers R for transmission of modulated optical signals from the second connector 370 to the first connector 310, and one or more wires for transmitting low-speed control signals (e.g., data and/or clock) between the first and second connectors 310 and 370.

The first connector 310 comprises a switch circuit 312, a transmitter circuit 314, a laser with optional multiplexer 316, a photo detector with optional demultiplexer 318, a receiver circuit 320, and a controller 322. Additionally, the first connector 310 comprises a bidirectional transceiver 330.

Similar to the previous embodiments, the controller 322 determines whether the first connector 310 is connected to a high speed multimedia data source or a high speed multimedia data sink based on an input. The input may include: (1) a user input by way of a user interface (e.g., a hard or soft switch); (2) detected signal activity on any of the contacts of the first and/or second connectors 310 and 370, such as contacts associated with the high speed data D0+/D0− to DN+/DN− and/or the contacts associated with the low-speed control signals C0 to CM; (3) a control signal received from control signal contacts C0 to CM of the first or second connector 310 or 370; and (4) other inputs.

If the controller 322 determines that the first connector 310 is connected to a high speed data source, the controller 322 generates a mode signal DIR SEL to configure the switch circuit 312 to route the high speed data electrical signaling received from the source via first connector contacts associated with data signals D0+/D0− to DN+/DN− to the transmitter circuit 314. The transmitter circuit 314, in turn, conditions the data signaling for driving (modulating) the laser source 316.

If the data communications cable 300 is configured similar to cable 100 of FIG. 1 (i.e., there is no multiplexer), the laser source 316 generates modulated optical data signals for transmission by way of corresponding optical fibers F. If the data communications cable 300 is configured similar to cable 200 of FIG. 2, one or more multiplexer multiplexes the high speed data signals for driving (modulating) corresponding one or more laser sources. The one or more laser sources 316 generate corresponding one or more modulated optical signals FO for transmission to the second connector 370 by way of the one or more optical fibers F, respectively.

If the controller 322 determines that the first connector 310 is connected to a high speed data sink, the controller 322 generates a mode signal DIR SEL to configure the switch circuit 312 to route high speed data electrical signaling generated by the receiver circuit 320 to the high speed data sink via the first connector contacts associated with data signals D0+/D0− to DN+/DN−.

In such case, the photo detector circuit 318 receives one or more modulated optical signals RO by way of one or more optical fibers R, respectively. If the data communications cable 300 is configured similar to cable 100 of FIG. 1 (e.g., does not include a DEMUX), the photo detector circuit 318 generates corresponding electrical signals in response to the modulated optical signals. If the data communications cable 300 is configured similar to cable 200 of FIG. 2 (includes one or more DEMUXs), the photo detector circuit 318 with the one or more DEMUXs generate corresponding high speed data electrical signals in response to one or more modulated optical signals, respectively.

The receiver circuit 320 conditions the corresponding high speed data electrical signals received from the photo detector circuit 318 in a suitable format for a high speed data sink. The switch circuit 312 routes the conditioned high speed data signals from the receiver circuit 320 to the high speed data sink connected to the first connector 310.

The transceiver 330 receives low-speed control signals (e.g., data and/or clock) from a device (high speed data source or sink) by way of contacts of the first connector 310 associated with signaling C0 to CM. The transceiver 330 configures the signaling for transmission to the second connector 370 by way of one or more wires. Similarly, the transceiver 330 receives low-speed control signals (e.g., data and/or clock) from the second connector 370 by way of the one or more wires, and configures the received signaling for providing to the device (high speed data source or sink) by way of contacts of the first connector 310 associated with signaling C0 to CM.

Since the data communications cable 300 is bidirectional, the operations of the components of the second connector 370 is effectively the same as the components of the first connector 310. For the sake of completeness, the description of the components and operations of the second connector 370 follows:

The second connector 370 comprises a switch circuit 372, a transmitter circuit 374, a laser with optional multiplexer 376, a photo detector with optional demultiplexer 378, a receiver circuit 380, and a controller 382. Additionally, the second connector 370 comprises a bidirectional transceiver 390.

Similar to the previous embodiments, the controller 382 determines whether the second connector 370 is connected to a high speed multimedia data source or a high speed multimedia data sink based on an input. The input may include: (1) a user input by way of a user interface (e.g., a hard or soft switch); (2) detected signal activity on any of the contacts of the second and/or first connectors 370 and 310, such as contacts associated with the high speed data D0+/D0− to DN+/DN− and/or the contacts associated with the low-speed control signals C0 to CM; (3) a control signal from the control signals contact C0 to CM of the second or first connector 370 or 310; and (4) other inputs.

If the controller 382 determines that the second connector 370 is connected to a high speed data source, the controller 372 generates a mode signal $\overline{\text{DIRSEL}}$ to configure the switch circuit 372 to route the high speed data electrical signaling received from the source via second connector contacts associated with data signals D0+/D0− to DN+/DN− to the transmitter circuit 374. The transmitter circuit 374, in turn, conditions the data signaling for driving (modulating) the laser source 376.

If the data communications cable 300 is configured similar to cable 100 of FIG. 1 (i.e., there is no multiplexer), the laser source 376 generates modulated optical data signals for transmission by way of corresponding optical fibers F. If the data communications cable 300 is configured similar to cable 200 of FIG. 2, one or more multiplexers multiplexes the high speed data signals for driving (modulating) corresponding one or more laser sources 316. The one or more laser sources 316 generate corresponding one or more modulated optical signals RO for transmission to the first connector 310 by way of the one or more optical fibers R, respectively.

If the controller 382 determines that the second connector 370 is connected to a high speed data sink, the controller 382 generates a mode signal $\overline{\text{DIRSEL}}$ to configure the switch circuit 372 to route high speed data electrical signaling generated by the receiver circuit 380 to the high speed data sink via the second connector contacts associated with data signals D0+/D0− to DN+/DN−.

In such case, the photo detector circuit 378 receives one or more modulated optical signals FO by way of one or more optical fibers F, respectively. If the data communications cable 300 is configured similar to cable 100 of FIG. 1 (e.g., does not include a DEMUX), the photo detector circuit 378 generates corresponding electrical signals in response to the modulated optical signals. If the data communications cable 300 is configured similar to cable 200 of FIG. 2 (includes one or more DEMUXs), the photo detector circuit 378 with the one or more DEMUXs generate corresponding high speed data electrical signals in response to one or more modulated optical signals.

The receiver circuit 380 conditions the corresponding high speed data electrical signals received from the photo detector circuit 378 in a suitable format for a high speed data sink. The switch circuit 372 routes the conditioned high speed data signals from the receiver circuit 380 to the high speed data sink connected to the second connector 370.

The transceiver 390 receives low-speed control signals (e.g., data and/or clock) from a device (high speed data source or sink) by way of contacts of the second connector 370 associated with signaling C0 to CM. The transceiver 390 configures the signaling for transmission to the first connector 310 by way of one or more wires. Similarly, the transceiver 390 receives low-speed control signals (e.g., data and/or clock) from the first connector 310 by way of the one or more wires, and configures the received signaling for providing to the device (high speed data source or sink) by way of contacts of the second connector 370 associated with signaling C0 to CM.

Figure 4:
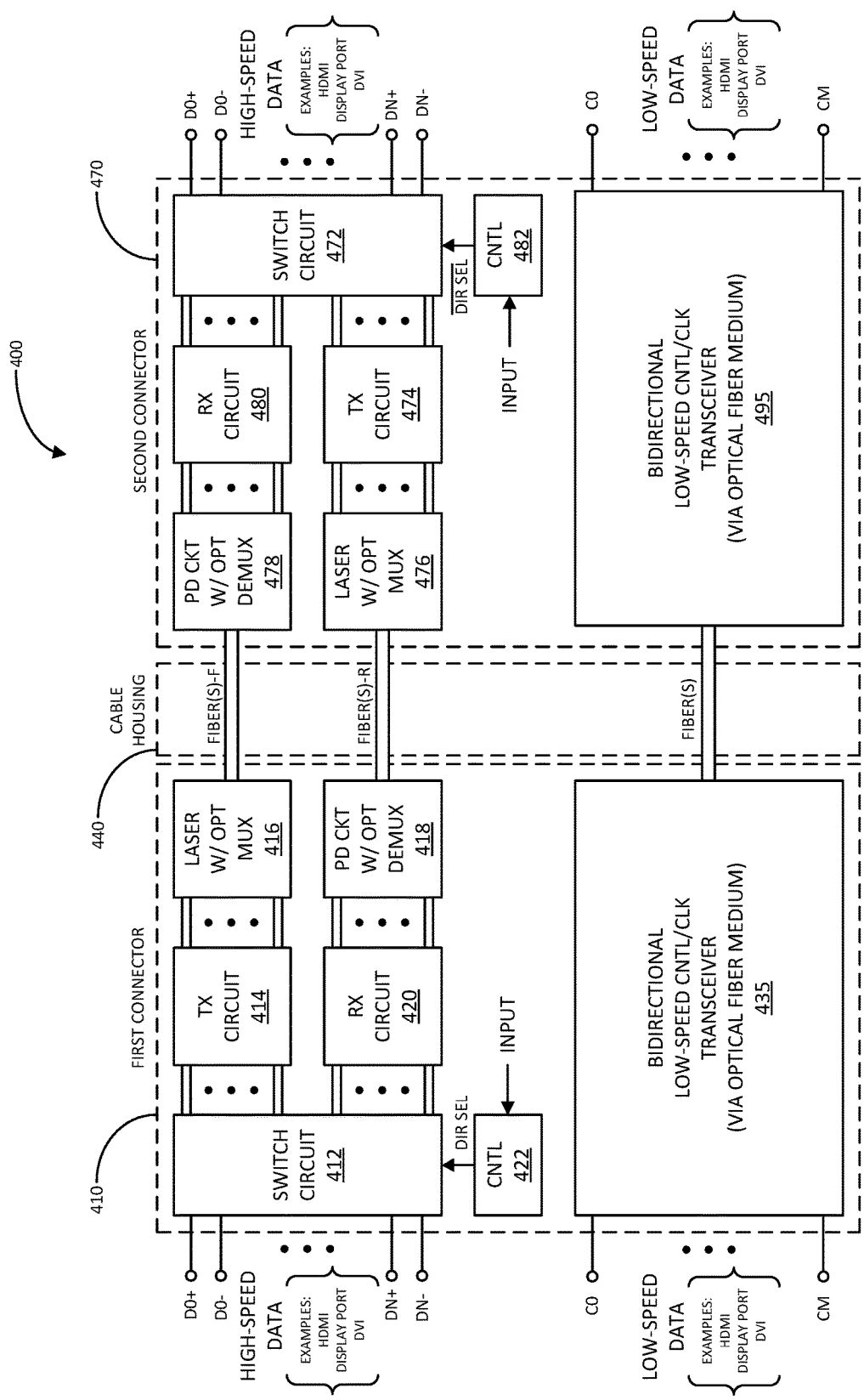
FIG. 4 illustrates a diagram of still another exemplary bidirectional data communications cable in accordance with another aspect of the disclosure.

FIG. 4 illustrates another exemplary bidirectional data communications cable 400 in accordance with another aspect of the disclosure. The data communications cable 400 is similar to that of cable 300 previously discussed, and includes many of the same or similar elements as indicated by the same reference numbers, except the most significant digit is a "4" rather than a "3". The data communications cable 400 differs from cable 300 in that the first and second connectors comprise respective transceivers for transmitting the low speed signaling between the connectors by way of one or more optical fibers. As such, the data communications cable may be implemented exclusively with optical fibers as the transmission medium.

In particular, the data communications cable 400 comprises a first connector 410, a cable housing 440, and a second connector 470. The cable housing 440 protectively encloses one or more optical fibers F for transmitting high speed data from the first connector 410 to the second connector 470, one or more optical fibers R for transmitting high speed data from the second connector 470 to the first connector 410, and one or more optical fibers for transmitting low speed control signals (e.g., data and/or clock) between the first and second connectors 410 and 470.

The first connector 410 comprises a switch circuit 412, a transmitter circuit 414, a laser source with optical multiplexer 416, a photo detector circuit 418, a receiver circuit 420, and a controller 422. These components of the first connector 410 are the same as those of the first connector 310 of cable 300 for transmitting high speed data from the first connector to the second connector, and vice-versa. Accordingly, the detailed description of the components 412, 414, 416, 418, 420, and 422 has been provided herein.

The first connector 410 further comprises a transceiver 435 for transmitting and receiving low speed control signals to and from the first and second connectors 410 and 470 by way of one or more optical fibers. Accordingly, the transceiver 435 may receive low speed control signals from a device (e.g., high speed data source or sink) by way of first connector contacts C0 to CM, and generate one or more optical signals modulated (and optionally multiplexed) with the low speed control signals for transmission to the second connector 470. Additionally, the transceiver 435 may receive one or more optical signals modulated (and optionally multiplexed) with the low speed control signals from the second connector 470, and demodulate (and optionally demultiplexed) the one or more optical signals to provide the low speed control signals to the device (e.g., high speed data source or sink) by way of the first connector contacts C0 to CM.

The second connector 470 comprises a switch circuit 472, a transmitter circuit 474, a laser source with optical multiplexer 476, a photo detector circuit 478, a receiver circuit 480, and a controller 482. These components of the second connector 470 are the same as those of the second connector 370 of cable 300 for transmitting high speed data from the second connector to the first connector, and vice-versa. Accordingly, the detailed description of the components 472, 474, 476, 478, 480, and 482 has been provided herein.

The second connector 470 further comprises a transceiver 495 for transmitting and receiving low speed control signals between the second and first connectors 470 and 410 by way of one or more optical fibers. Accordingly, the transceiver 495 may receive low speed control signals from a device (e.g., high speed data source or sink) by way of second connector contacts C0 to CM, and generate one or more optical signals modulated (and optionally multiplexed) with the low speed control signals for transmission to the first connector 410. Additionally, the transceiver 495 may receive one or more optical signals modulated (and optionally multiplexed) with the low speed control signals from the first connector 410, and demodulate (and optionally demultiplexed) the one or more optical signals to provide the low speed control signals to the device (e.g., high speed data source or sink) by way of the second connector contacts C0 to CM.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A bidirectional data communications cable, comprising:
    a first connector configured to mate with a corresponding connector of a data source or a data sink;
    a first modulator configured to modulate a first optical signal with a first data signal if the first connector is mated with the corresponding connector of the data source;
    a first demodulator configured to demodulate a second optical signal to produce a second data signal if the first connector is mated with the corresponding connector of the data sink;
    a first switch circuit configured to:
        route the first data signal from the data source to the first modulator if the first connector mated with the corresponding connector of the data source; and
        route the second data signal from the first demodulator to the data sink if the first connector is connected to the corresponding connector of the data sink;
    a second connector configured to mate with a corresponding connector of the data source or the data sink;
    a second modulator configured to modulate the second optical signal with the second data signal if the second connector is mated with the corresponding connector of the data source;
    a second demodulator configured to demodulate the first optical signal to produce the first data signal if the second connector is mated with the corresponding connector of the data sink;
    a second switch circuit configured to:
        route the second data signal from the data source to the second modulator if the second connector is mated with the corresponding connector of the data source; and
        route the first data signal from the second demodulator to the data sink if the second connector is mated with the corresponding connector of the data sink; and
    a first set of one or more optical fibers for transmitting the first modulated optical signal from the first connector to the second connector; and
    a second set of one or more optical fibers for transmitting the second modulated optical signal from the second connector to the first connector.

2. The bidirectional data communications cable of claim 1, further comprising a controller configured to:
    determine whether the first connector is connected to the data source or the data sink; and
    configure the first switch circuit based on said determination.

3. The bidirectional data communications cable of claim 2, wherein the controller is configured to determine whether the first connector is connected to the data source or the data sink based on a user input.

4. The bidirectional data communications cable of claim 2, wherein the controller is configured to determine whether the first connector is connected to the data source or the data sink based on signal activity at one or more contacts of the first connector, at one or more contacts of the second connector, or at both the one or more contacts of the first connector and the one or more contacts of the second connector.

5. The bidirectional data communications cable of claim 2, wherein the controller is configured to determine whether the first connector is connected to the data source or the data sink based on a control signal received by way of one or more contacts of the first connector, one or more contacts of the second connector, or both the one or more contacts of the first connector and the one or more contacts of the second connector.

6. The bidirectional data communications cable of claim 1, wherein the first modulator comprises:
    a transmitter circuit configured to generate a modulating signal based on the first data signal; and
    a laser source configured to generate the first modulated optical signal based on the modulating signal.

7. The bidirectional data communications cable of claim 1, wherein the first modulator comprises:
    a transmitter circuit configured to generate a modulating signal based on the first data signal;
    a multiplexer configured to generate a multiplexed modulating signal based on the modulating signal; and
    a laser source configured to generate the first modulated optical signal based on the multiplexed modulating signal.

8. The bidirectional data communications cable of claim 1, wherein the first demodulator comprises:
    a photo detector circuit configured to generate an electrical signal based on the second modulated optical signal; and
    a receiver circuit configured to generate the second data signal based on the electrical signal.

9. The bidirectional data communications cable of claim 1, wherein the first demodulator comprises:
    a photo detector circuit configured to generate an electrical signal based on the second modulated optical signal;
    a demultiplexer configured to generate a demultiplexed signal based on the electrical signal; and
    a receiver circuit configured to generate the second data signal based on the demultiplexed signal.

10. The bidirectional data communications cable of claim 1, further comprising a controller is configured to:
    determine whether the second connector is connected to the data source or the data sink; and configure the second switch circuit based on said determination.

11. The bidirectional data communications cable of claim 10, wherein the controller is configured to determine whether the second connector is connected to the data source or the data sink based on a user input.

12. The bidirectional data communications cable of claim 10, wherein the controller is configured to determine whether the second connector is connected to the data source or the data sink based on signal activity at one or more contacts of the second connector, at one or more contacts of the first connector, or at both the one or more contacts of the second connector and the one or more contacts of the first connector.

13. The bidirectional data communications cable of claim 10, wherein the controller is configured to determine whether the second connector is connected to the data source or the data sink based on a control signal received by way of one or more contacts of the second connector, one or more contacts of the first connector, or both the one or more contacts of the second connector and the one or more contacts of the first connector.

14. The bidirectional data communications cable of claim 1, wherein the second modulator comprises:
a transmitter circuit configured to generate a modulating signal based on the second data signal; and
a laser source configured to generate the second modulated optical signal based on the modulating signal.

15. The bidirectional data communications cable of claim 1, wherein the second modulator comprises:
a transmitter circuit configured to generate a modulating signal based on the second data signal;
a multiplexer configured to generate a multiplexed modulating signal based on the modulating signal; and
a laser source configured to generate the second modulated optical signal based on the multiplexed modulating signal.

16. The bidirectional data communications cable of claim 1, wherein the second demodulator comprises:
a photo detector circuit configured to generate an electrical signal based on the first modulated optical signal; and
a receiver circuit configured to generate the first data signal based on the electrical signal.

17. The bidirectional data communications cable of claim 1, wherein the second demodulator comprises:
a photo detector circuit configured to generate an electrical signal based on the first modulated optical signal;
a demultiplexer configured to generate a demultiplexed signal based on the electrical signal; and
a receiver circuit configured to generate the first data signal based on the demultiplexed signal.

18. The bidirectional data communications cable of claim 1, further comprising:
one or more wires; and
a transceiver configured to:
receive a first control signal from the data source or the data sink by way of one or more contacts of the first connector;
generate a first transmit signal based on the first control signal for transmission to the second connector by way of the one or more wires;
receive a second transmit signal from the second connector by way of the one or more wires; and
generate a second control signal based on the second transmit signal for providing to the data source or the data sink by way of the one or more contacts of the first connector.

19. The bidirectional data communications cable of claim 1, further comprising:
one or more wires; and
a transceiver configured to:
receive a first control signal from the data source or the data sink by way of one or more contacts of the second connector;
generate a first transmit signal based on the first control signal for transmission to the first connector by way of the one or more wires;
receive a second transmit signal from the first connector by way of the one or more wires; and
generate a second control signal based on the second transmit signal for providing to the data source or the data sink by way of the one or more contacts of the second connector.

20. The bidirectional data communications cable of claim 1, further comprising:
a third set of one or more optical fibers;
a transceiver configured to:
receive a first control signal from the data source or the data sink by way of one or more contacts of the first connector;
generate a third modulated optical signal based on the first control signal for transmission to the second connector by way of the third set of one or more optical fibers;
receive a fourth modulated optical signal from the second connector by way of the third set of one or more optical fibers; and
generate a second control signal based on the fourth modulated optical signal for providing to the data source or the data sink by way of the one or more contacts of the first connector.

21. The bidirectional data communications cable of claim 1, further comprising:
a third set of one or more optical fibers;
a transceiver configured to:
receive a first control signal from the data source or the data sink by way of one or more contacts of the second connector;
generate a third modulated optical signal based on the first control signal for transmission to the first connector by way of the third set of one or more optical fibers;
receive a fourth modulated optical signal from the first connector by way of the third set of one or more optical fibers; and
generate a second control signal based on the fourth modulated optical signal for providing to the data source or the data sink by way of the one or more contacts of the second connector.

22. The bidirectional data communications cable of claim 1, further comprising a cable housing including opposite ends mechanically coupled or attached to the first and second connectors, respectively, wherein the cable housing at least partially encloses the first set of one or more fibers and the second set of one or more fibers.

* * * * *